(No Model.)
E. E. & E. G. RAFER.
MACHINE FOR MAKING ELECTRIC CABLES.
No. 280,764. Patented July 3, 1883.
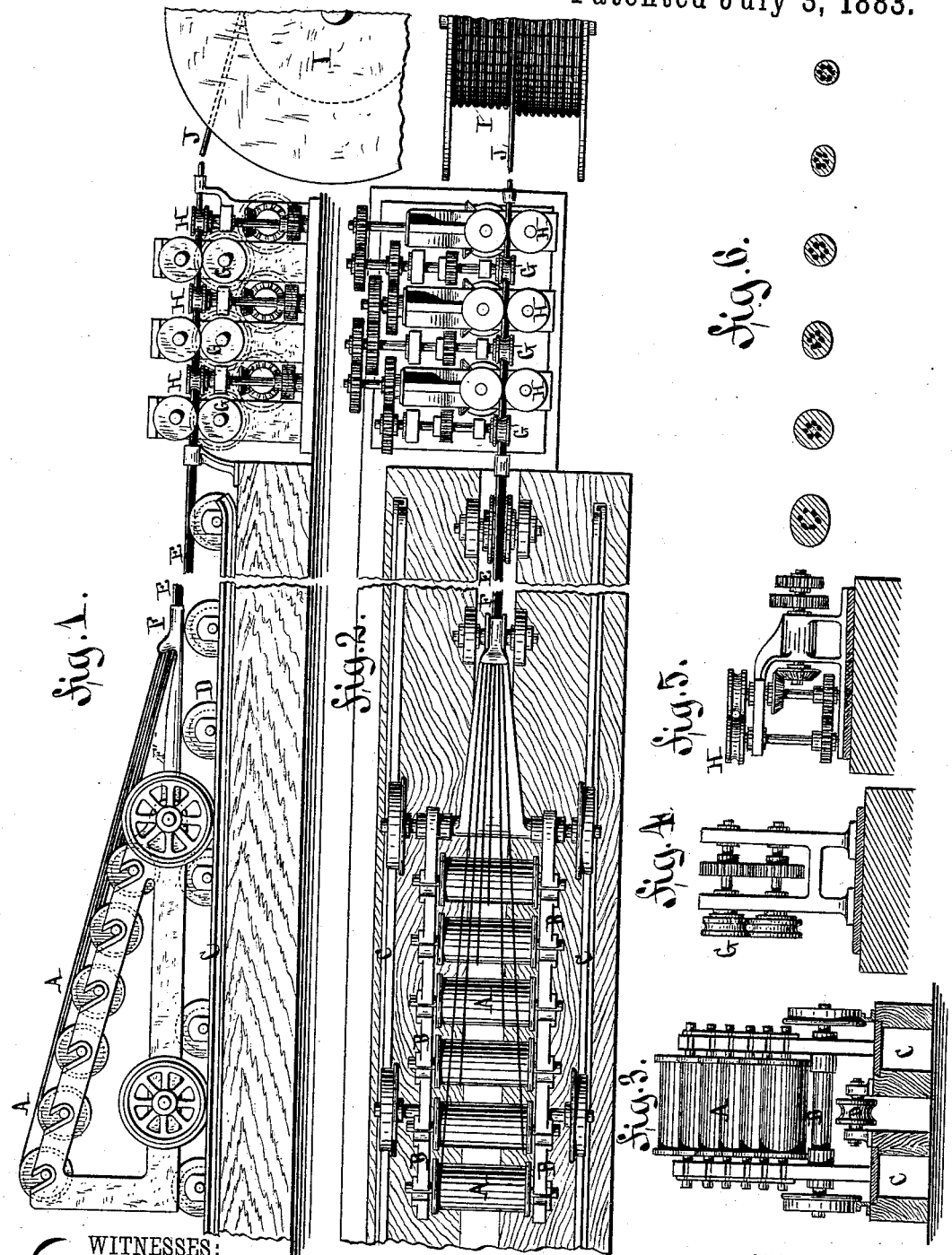
WITNESSES:
INVENTOR
Eugène Germain Rafer
Ernest Edmond Rafer
BY
Paul Goepel
ATTORNEY

UNITED STATES PATENT OFFICE.

ERNEST E. RAFER AND EUGÈNE G. RAFER, OF ST. CHAMOND, FRANCE, ASSIGNOR TO ALAMAGNY & ORIOL, OF SAME PLACE.

MACHINE FOR MAKING ELECTRIC CABLES.

SPECIFICATION forming part of Letters Patent No. 280,764, dated July 3, 1883.

Application filed October 27, 1882. (No model.) Patented in France July 20, 1881, No. 144,034, and in Germany February 28, 1882, No. 19,466.

*To all whom it may concern:*

Be it known that we, ERNEST EDMOND RAFER and EUGÈNE GERMAIN RAFER, both of St. Chamond, Department of the Loire, France, have invented certain new and useful Improvements in Machines for Making Electric Cables, (for which Letters Patent No. 144,034, dated July 20, 1881, have been granted to us in France,) of which the following is a specification.

The machine which forms the object of this application is intended to facilitate the covering or surrounding of wires or cables for conducting electricity with lead. This has been hitherto effected by means of lead pipes the interior section of which is nearly equal to the thickness of the cable, so that the insertion of the cable is difficult, and the friction so strong as to cause the rupture of the wires, or, at least, injury to their insulating-covering.

In our method the lead pipe has a much larger interior diameter than the diameter of the cable, so that the insertion of the latter into the pipe is very easy. This pipe is then rolled in one continuous operation on the cable, so as to make it adhere thereto, and stretching it to about double the length of the cable without drawing out or pressing upon the cable.

In the accompanying drawings, which illustrate our machine for rolling telegraph and telephone cables, Figure 1 is a side view. Fig. 2 is a corresponding plan. Fig. 3 is an end view of the wire-supporting carriage and its rails. Fig. 4 is a side elevation of one pair of rolls with horizontal axles; Fig. 5, a similar view of a pair of rolls with vertical axles, and Fig. 6 shows the successive changes in the cross-section of the covering lead pipe while being rolled onto the cable.

Similar letters of reference indicate corresponding parts.

The cable is made in the following manner: When a cable covered with lead is to have one-fifth of an inch in diameter, a lead pipe of about two-fifths of an inch should be developed upon a horizontal board. Through this pipe a small piston is made to pass, either by drawing or propulsion, to which piston a rather strong band is attached. To one end of this band the conducting-wires are attached, while the other end is pulled, so that the piston, in passing through the lead pipe, carries a corresponding length of conducting-wires along. Each conducting-wire is wound up on a cylindrical roller, A. These rollers, more or less in number, according to the number of wires composing the cable, are mounted upon a carriage, B, running upon rails C. Between the rails C are arranged, in the middle of the carriage-way, grooved pulleys D, which support the lead pipe E. A fixed sleeve, F, at the end of a forward extending arm, F', of the carriage, serves as a guide for gathering the different conducting-wires and paying them out in the form of a cable, so as to receive the lead covering, which is obtained by passing the length of cable covered by the lead pipe through a train of alternating horizontal and vertical rolls, G and H. The effect of these rolls is to reduce the diameter of the lead pipe and stretch the lead so as to cover another length of cable, which latter is drawn into the extended lead pipe as the stretching of the lead in the mill proceeds. The grooves of rolls G and H gradually decrease in size until they have in the last pair of rolls of the train the final diameter of the cable. The lead pipe is extended, its cross-section becomes smaller, and it alternately passes from an elliptic to a circular shape, Fig. 6, each circle having a diameter equal to the smaller axis of the immediately preceding ellipse. At the same time the wires unroll on their rollers A to correspond with the extension of the pipe, and in this operation the said wires are neither drawn out nor rolled, as the pipe, having become round, is molded, so to speak, around the internal cable. The gears which govern the motion of the rolls are so calculated that their velocity may gradually increase, so as to correspond with the extension of the pipe, whereby the latter remains straight during its passage through the train of rolls. The finished cable J is rolled upon a drum, I, and it is clear that in a mill about three hundred feet long cables of six hundred feet and above may be manufactured, which is an important advantage. In this operation the lead pipe is rolled out and extended without injury to the internal wires, the last pair of rolls imparting the final pressure to the pipe. No deterioration of the wires, therefore, takes place. For each pair of vertical rolls H we may substitute a drawing-frame, which would restore the pipe to the round shape, so that in the manufacture of cables both rolling and drawing could be combined. The number of rolls may naturally be varied, according to the reduction in diameter which is to be obtained.

Having thus fully described our invention, what we claim as new, and desire to secure by Letters Patent, is—

1. The combination, with a train of horizontal and vertical rolls, of a movable carriage supporting as many rollers as there are conducting-wires forming the cable, said carriage following the cable and supplying the required length of wires as the covering lead pipe is stretched over the same, substantially as set forth.

2. The combination, with a train of horizontal and vertical rolls, of a movable carriage supporting as many rollers as there are wires forming the cable, said carriage having a fixed guide-sleeve at its front end, and grooved rollers for guiding the cable and its lead pipe covering to the train of rolls, substantially as set forth.

In testimony that we claim the foregoing as our invention we have signed our names in presence of two subscribing witnesses.

ERNEST EDMOND RAFER.
EUGÈNE GERMAIN RAFER.

Witnesses:
F. HUGONNARD,
OPIGEY.